United States Patent [19]
Umino et al.

[11] Patent Number: 6,121,353
[45] Date of Patent: *Sep. 19, 2000

[54] POLYMER ALLOY OF AN ETHYLENE-TETRAFLUOROETHYLENE COPOLYMER

[75] Inventors: Masao Umino; Yasuki Miura; Masataka Yokota, all of Kawasaki, Japan

[73] Assignee: Asahi Glass Company Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/101,438

[22] PCT Filed: Nov. 13, 1997

[86] PCT No.: PCT/JP97/04146

§ 371 Date: Jul. 14, 1998

§ 102(e) Date: Jul. 14, 1998

[87] PCT Pub. No.: WO98/21277

PCT Pub. Date: May 22, 1998

[30] Foreign Application Priority Data

Nov. 14, 1996 [JP] Japan ................................. 8-303343

[51] Int. Cl.[7] .............................. C08K 5/54; C08L 27/12; C08L 81/04
[52] U.S. Cl. ...................... 524/262; 524/261; 524/546; 524/609; 525/537
[58] Field of Search ................................. 524/261, 262, 524/545, 546, 537

[56] References Cited

U.S. PATENT DOCUMENTS

| | | | |
|---|---|---|---|
| 4,005,157 | 1/1977 | Mattiussi et al. | 524/546 |
| 4,610,916 | 9/1986 | Ballard | 525/189 |
| 4,787,991 | 11/1988 | Morozumi et al. | 252/12.4 |
| 5,670,593 | 9/1997 | Araki et al. | 526/245 |

FOREIGN PATENT DOCUMENTS

| | | |
|---|---|---|
| 0 460 689 | 12/1991 | European Pat. Off. . |
| 62-232457 | 10/1987 | Japan . |
| 4-285663 | 10/1992 | Japan . |
| 8-53592 | 2/1996 | Japan . |
| 8-151497 | 6/1996 | Japan . |

OTHER PUBLICATIONS

Patent Abstracts of Japan, vol. 1996, No. 08, Aug. 30, 1996, JP 8–85758, Apr. 2, 1996.

Patent Abstracts of Japan, vol. 016, No. 575 (C–1011), Dec. 15, 1992, JP 4–227777, Aug. 17, 1992.

Patent Abstracts of Japan, vol. 014, No. 412 (C–0755), Sep. 6, 1990, JP 2–155943, Jun. 15, 1990.

*Primary Examiner*—Tae Yoon
*Attorney, Agent, or Firm*—Oblon, Spivak, McClelland, Maier & Neustadt, P.C.

[57] ABSTRACT

A polymer alloy comprising ETFE having a melting point of at most 250° C. and a melt flow rate of at least 20 at 297° C., PPS and a compatibilizer (such as 3-aminopropyltriethoxysilane).

18 Claims, No Drawings

POLYMER ALLOY OF AN ETHYLENE-TETRAFLUOROETHYLENE COPOLYMER

TECHNICAL FIELD

The present invention relates to a polymer alloy comprising an ethylene-tetrafluoroethylene copolymer (hereinafter referred to as ETFE), a polyphenylene sulfide (hereinafter referred to as PPS) and a compatibilizer.

BACKGROUND ART

ETFE is excellent in heat resistance, flame retardancy, chemical resistance, weather resistance, a low friction property and a low dielectric characteristic, and is used in a wide range of fields, such as coating materials for heat resistant flame retarding electric wires, corrosion resistant piping materials for chemical plants, agricultural vinyl house materials, and release coating materials for kitchen utensils. However, since the intermolecular cohesion is weak, the affinity to other materials is poor, and there has been a problem such that a polymer alloy having excellent properties can hardly be obtained.

In order to improve the compatibility of the fluorine-containing copolymer and a polyolefin, a method of using a polyolefin as alkyl acrylate-modified (JP-B-4-73459), or a method of incorporating carboxyl groups, hydroxyl groups or epoxy groups to a fluorine-containing polymer (JP-A-62-57448), has been proposed.

The former is effective in a case where the fluorine-containing polymer is a vinylidene fluoride type polymer or a vinyl fluoride type polymer having a high polarity, but in the case of ETFE having a low polarity, the compatibility can not be improved.

Whereas, the latter may, for example, be (1) a method wherein a fluorine-containing polymer and a non-fluorine type thermoplastic polymer having functional groups are blended, (2) a method wherein, in the synthesis of a fluorine-containing polymer, polymer units based on the polymerization of a polymerizable monomer having a functional group, are incorporated, (3) a method wherein the reactive groups present in a fluorine-containing polymer are reacted with a compound having a functional group or a compound capable of forming a functional group by the reaction, or (4) a method wherein a fluorine-containing polymer is modified by e.g. oxidation, hydrolysis or thermal decomposition.

However, with respect to ETFE, the above method (1) is not effective, since, as mentioned above, the fluorine-containing polymer and the non-fluorine type thermoplastic polymer having a functional group, have no compatibility. The above method (2) is expensive and not practical, since the monomer useful for the copolymerization reaction is very limited. The above method (3) can not be adopted since the fluorine-containing polymer usually has no reactive group. In the above method (4), the fluorine-containing polymer is so stable that it is impossible to form carboxyl groups, hydroxyl groups or epoxy groups by e.g. oxidation, hydrolysis or thermal decomposition.

On the other hand, a thermoplastic composition obtained by blending a fluorine-containing polymer, PPS and an aminoalkoxysilane, has been proposed (JP-A-8-53592). This composition has a part of mechanical properties improved, but it is not disclosed and unclear whether it is in a form of a polymer alloy having a good dispersed state. Further, with respect to ETFE, it is disclosed to use Afron COP C-88A grade in Examples. However, the present inventors have found that from ETFE of such a grade and PPS, it is impossible to obtain a polymer alloy having stable mechanical properties in a good dispersed state even in the presence of an aminoalkoxysilane.

DISCLOSURE OF THE INVENTION

The present invention provides a polymer alloy having good mechanical properties, wherein ETFE and PPS are microscopically uniformly dispersed.

BEST MODE FOR CARRYING OUT THE INVENTION

The present inventors have firstly found a compatibilizer effective for ETFE by lowering the melting point of ETFE and lowering the degree of crystallinity and secondly found it possible to increase the melt-mixing property of ETFE and PPS by increasing the melt flow rate of ETFE at 297° C. (hereinafter "a melt flow rate at 297° C." will be referred to as "MFR") to lower the viscosity (the molecular weight) and thereby to minimize the viscosity difference from PPS which usually has a low molecular weight and low viscosity, and from the foregoing two aspects, have found it possible to obtain a good polymer alloy wherein ETFE and PPS are microscopically dispersed, and thus have arrived at the present invention.

Namely, the present invention is a polymer alloy comprising (a) an ethylene-tetrafluoroethylene copolymer having a melting point of at most 250° C. and a melt flow rate of at least 20 at 297° C., (b) a polyphenylene sulfide, and (c) a compatibilizer.

For ETFE to be used in the present invention, it is preferred to copolymerize a small amount of a third monomer in addition to ethylene and tetrafluoroethylene. As the third monomer, a compound having no hydrogen atom in a polymerizable unsaturated group, or a compound having hydrogen atoms in a polymerizable unsaturated group, may be employed.

As the compound having no hydrogen atom in a polymerizable unsaturated group, hexafluoropropylene or a perfluoro(alkylvinyl ether) may, for example, be mentioned. As the compound having hydrogen atoms in a polymerizable unsaturated group, an olefin such as propylene, 1-butene or 2-butene, a fluorine-containing olefin such as vinylidene fluoride or (perfluorobutyl)ethylene, a vinyl ether such as an alkylvinyl ether or a fluoroalkylvinyl ether, or a (meth)acrylate such as a fluoroalkyl methacrylate or a fluoroalkyl acrylate, may, for example, be mentioned.

As ETFE, one having a melting point of at most 250° C. and a MFR of at least 20, is used. ETFE is preferably one having a melting point of at most 235° C. and a MFR of at least 20, or one having a melting point of at most 250° C. and a MFR of at least 30, more preferably one having a melting point of at most 235° C. and a MFR of at least 30.

As a method for lowering the melting point, the reaction ratio of ethylene to tetrafluoroethylene (amount of ethylene reacted/amount of tetrafluoroethylene reacted) may be departed from 1 (molar ratio), so that the alternating nature is lowered, and the degree of crystallinity is lowered, or polymerization units based on a third monomer are increased to lower the degree of crystallinity, or by using both of them, the melting point can be made to be at most 250° C.

Specifically, the amount of ethylene reacted/amount of tetrafluoroethylene reacted, is preferably at most 0.82 (molar ratio), more preferably at most 0.75 (molar ratio) and at least 0.25 (molar ratio). Further, the polymer units based on (perfluorobutyl)ethylene as a third monomer, are made preferably to be at least 2 mol %, more preferably at least 3 mol % and at most 30 mol %, in ETFE, whereby the melting point can be made to be at most 250° C.

With respect to MFR, the molecular weight of ETFE may be lowered to increase MFR to a level of at least 20, by a method carried out in a usual radical polymerization, such as by increasing the molecular weight controlling agent during the polymerization, by increasing the amount of the initiator, or by reducing the monomer pressure.

PPS to be used in the present invention is a polymer containing at least 70 mol %, preferably at least 80 mol %, of a repeating unit of the structural formula [—$C_6H_4$—S—] (wherein —$C_6H_4$— is a phenylene group). If the above repeating unit is less than 70 mol %, the crystallinity as a characteristic of a crystalline polymer, tends to be low, and the inherent physical properties of PPS tend to be impaired, such being undesirable.

PPS is generally known to be one having a linear molecular structure (linear type) having no branched or crosslinked structure, one having a molecular structure having a branched or crosslinked structure to some extent (half linear type) or one having a molecular structure having a high density of branched or crosslinked structures (crosslinked type), depending upon the process for its production. One having a suitable molecular structure is used for molding depending upon the particular purpose of use.

With PPS, the viscosity changes to a large extent depending upon the polymerization method. The viscosity of PPS formed by polymerization, i.e. a so-called viscosity upon polymerization, is usually at a level of from 1000 to 2000 poise at 300° C. in the case of linear type PPS, at a level of from 200 to 600 poise in the case of the half linear type PPS, and at a level of at most 100 poise in the case of the crosslinked type PPS.

Among these, the half linear type PPS and the crosslinked type PPS are used for molding after increasing their molecular weights by a means such as heat treatment after the polymerization to bring their viscosities to a level of from 1000 to 2000 poise at 300° C. In the present invention, PPS of any structure can be used, but one having a viscosity upon polymerization of at least 200 poise at 300° C. is preferred, although the reason is not clearly understood. Within this viscosity range, PPS of a linear type or a half linear type is particularly preferred.

The viscosity of PPS to be used for molding, i.e. the viscosity upon polymerization with respect to the linear type PPS or the viscosity after heat treatment with respect to the half linear type and crosslinked type PPS, is not particularly limited so long as a molded product can be obtained, but from the viewpoint of toughness of PPS itself, one having a viscosity of at least 100 poise at 300° C. is preferred, and from moldability, one having at most 10000 poise is preferred.

The compatibilizer to be used in the present invention is one which has compatibility with ETFE and compatibility or reactivity with PPS and which is capable of performing compatibilizing effects during the melt mixing of ETFE and PPS and has heat resistance. A preferred compatibilizer is an organo hydrolyzable silane having a reactive functional group, which is reactive with PPS. As the organo hydrolyzable silane, an organo alkoxysilane having an amino group or an epoxy group as the reactive functional group, is preferred. Particularly preferred is an organo alkoxysilane having an amino group.

Specific examples of the organo alkoxysilane include 3-aminopropyltriethoxysilane, N-(2-aminoethyl)-3-aminopropyltrimethoxysilane, N-(2-aminoethyl)-3-aminopropylmethyldimethoxysilane, 3-glycidyloxypropyltrimethoxysilane, 3-ureidepropyltriethoxysilane, N-phenyl-3-aminopropyltrimethoxysilane, N-allyl-3-aminopropyltrimethoxysilane and 2-(3,4-epoxycyclohexyl)ethyltrimethoxysilane.

The blend proportions of ETFE and PPS being within a range of from 5/95 to 95/5, are preferred in order to obtain a polymer alloy having excellent properties. The blend amount of the compatibilizer is preferably from 0.1 to 10 wt %, particularly preferably from 0.3 to 5 wt %, relative to the sum of ETFE and PPS.

The polymer alloy of the present invention is uniformly dispersed to such an extent that dispersed particles can not be ascertained by observation by means of a scanning electron microscope, i.e. in a state where the average dispersed particle size is at most 1 $\mu$m, and has excellent mechanical properties.

The polymer alloy of the present invention can be used as a molding material for production of various molded products. To the polymer alloy, various fillers such as inorganic powder, glass fibers, carbon fibers, metal oxides and carbon, may be incorporated in a range not to impair the performance. Further, other than the fillers, pigments, ultraviolet absorbers or any other optional additives may be mixed as the case required.

Methods for measuring the physical properties and characteristics of the polymer alloy are as follows.

Dispersed state: Observed by a scanning electron microscope with 720 magnifications.

MFR: In accordance with a test method of ASTM D3159, 5 g of a sample was extruded at 297° C. under a load of 5 kg from a nozzle having a die diameter of 2 mm and a die length of 8 mm, and the weight of the sample extruded for 15 seconds, was calculated to a value corresponding to the amount extruded for 10 minutes (g/10 min).

Melting point: The heat absorption peak by DSC was measured at a temperature raising rate of 10° C./min.

Viscosity: By a kouka-type flow tester, 1.5 g of a sample was extruded at 300° C. under a load of 20 kg from a nozzle having a die diameter of 1 mm and a die length of 10 mm, and the viscosity was calculated from the extruded volume flow rate Q (ml/sec).

Flexural strength: In accordance with ASTM D790.

Tensile elongation: In accordance with ASTM D638.

Izod impact strength: In accordance with ASTM D256.

Now, the present invention will be described in further detail with reference to Examples (Examples 1, 2 and 8 to 10) and Comparative Examples (Examples 3 to 7 and 11). However, the present invention is by no means restricted thereto.

EXAMPLE 1

79 wt % of PPS (PPS having a viscosity of 1160 poise at 300° C. obtained by heat treatment of PPS of a half linear type having a viscosity, upon polymerization, of 300 poise at 300° C.), 20 wt % of ETFE-1 having a melting point of 230° C. and a MFR of 45 and 1 wt % of 3-aminopropyltriethoxysilane, were dry-blended and then kneaded and extruded at an extrusion temperature of 330° C. by means of a twin screw extruder, to obtain pellets. The obtained pellets were injection-molded at an injection temperature of 320° C. at a mold temperature of 140° C. to obtain a molded specimen. The dispersed state of the broken surface of the molded specimen was observed by an electron microscope, whereby no dispersed particles were ascertained, and the average dispersed particle size was at most 1 μm. The results of measurements of mechanical properties of the molded specimen are shown in Table 1.

EXAMPLES 2 to 7

Tests were carried out in the same manner as in Example 1 by using, instead of ETFE-1 used in Example 1, ETFE-2 having a melting point of 230° C. and a MFR 25 in Example 2, ETFE (Afron COP C-88A, manufactured by Asahi Glass, melting point: 267° C., MFR: 12) in Example 3, ETFE (Afron COP C-88AX, manufactured by Asahi Glass, melting point: 260° C., MFR: 11) in Example 4, ETFE (Afron COP C-88AXX, manufactured by Asahi Glass, melting point: 256° C., MFR: 10) in Example 5, ETFE (Afron COP C-88AM, manufactured by Asahi Glass, melting point: 260° C., MFR: 36) in Example 6, and ETFE-3 having a melting point of 230° C. and a MFR of 14 in Example 7. The results are shown in Table 1.

EXAMPLE 8

A test was carried out in the same manner as in Example 1 by using linear type PPS (PPS having a viscosity, upon polymerization, of 1250 poise at 300° C.) instead of PPS used in Example 1. The average dispersed particle size of dispersed particles of the molded specimen, and the results of measurements of the mechanical properties, are shown in Table 1.

EXAMPLE 9

A test was carried out in the same manner as in Example 1 using the same amount of 3-glycidyloxypropyltrimethoxysilane instead of 3-amiopropyltriethoxysilane used in Example 1. The average dispersed particle size of dispersed particles of the molded specimen and the results of measurements of the mechanical properties, are shown in Table 1.

EXAMPLE 10

A test was carried out in the same manner by changing PPS, ETFE-1 and the compatibilizer used in Example 1 to 59 wt % of PPS, 40 wt % of ETFE-1 and 1 wt % of the compatibilizer. The average dispersed particle size of dispersed particles of the molded specimen and the results of measurements of the mechanical properties, are shown in Table 1.

EXAMPLE 11

A test was carried out without using a compatibilizer and changing PPS and ETFE-1 used in Example 1 to 80 wt % of PPS and 20 wt % of ETFE-1. The average dispersed particle size of dispersed particles of the molded specimen and the results of measurements of the mechanical properties, are shown in Table 1.

TABLE 1

| Examples | ETFE | Average dispersed particle size | Flexural strength (kg/mm$^2$) | Tensile elongation (%) | Izod impact strength (kg · cm/cm$^2$) | |
|---|---|---|---|---|---|---|
| | | | | | Notched | Not notched |
| 1 | ETFE-1 | <1 μm | 15.1 | 10.5 | 3.2 | Non-destructive |
| 2 | ETFE-2 | <1 μm | 14.8 | 10.0 | 3.3 | Non-destructive |
| 3 | C-88A | 5 μm | 13.1 | 4.0 | 2.1 | 60.7 |
| 4 | C-88AX | 7 μm | 12.9 | 4.0 | 1.6 | 60.2 |
| 5 | C-88AXX | 2 μm | 12.6 | 6.2 | 1.6 | Non-destructive |
| 6 | C-88AM | 5 μm | 13.1 | 4.2 | 1.4 | 35.3 |
| 7 | ETFE-3 | 1.4 μm | 12.3 | 4.1 | 2.3 | 40.7 |
| 8 | ETFE-1 | <1 μm | 16.2 | 11.5 | 3.5 | Non-destructive |
| 9 | ETFE-1 | <1 μm | 14.5 | 9.8 | 3.0 | Non-destructive |
| 10 | ETFE-1 | <1 μm | 9.0 | 12.4 | 3.1 | Non-destructive |
| 11 | ETFE-1 | 8 μm | 10.2 | 3.2 | 1.2 | 10.3 |

Industrial Applicability

By using ETFE having a melting point of at most 250° C. and a MFR of at least 20, it is possible to obtain a polymer alloy having good mechanical properties, wherein ETFE and PPS are microscopically dispersed.

What is claimed is:

1. A polymer alloy comprising (a) an ethylene-tetrafluoroethylene copolymer having a melting point of at most 235° C. and a melt flow rate of at least 20 g/10 min at 297° C. by ASTM D3159, (b) a polyphenylene sulfide, and (c) a compatibilizer.

2. The polymer alloy according to claim 1, wherein the compatibilizer is an organo hydrolyzable silane having a reactive functional group.

3. The polymer alloy according to claim 2, wherein the reactive functional group is an amino group or an epoxy group.

4. The polymer alloy according to claim 1, wherein the viscosity of the polyphenylene sulfide upon polymerization is at least 200 poise at 300° C.

5. The polymer alloy according to claim 1, wherein the proportions of the ethylene-tetrafluoroethylene copolymer and the polyphenylene sulfide are from 5/95 to 95/5 (by weight ratio).

6. The polymer alloy according to claim 5, wherein the compatibilizer is an organo hydrolyzable silane having a reactive functional group.

7. The polymer alloy according to claim 6, wherein the reactive functional group is an amino group or an epoxy group.

8. The polymer alloy according to claim 5, wherein the viscosity of the polyphenylene sulfide upon polymerization is at least 200 poise at 300° C.

9. The polymer alloy according to claim 1, wherein the proportion of the compatibilizer is from 0.1 to 10 wt % relative to the sum of the ethylene-tetrafluoroethylene copolymer and the polyphenylene sulfide.

10. The polymer alloy according to claim 9, wherein the compatibilizer is an organo hydrolyzable silane having a reactive functional group.

11. The polymer alloy according to claim 10, wherein the reactive functional group is an amino group or an epoxy group.

12. The polymer alloy according to claim 9, wherein the viscosity of the polyphenylene sulfide upon polymerization is at least 200 poise at 300° C.

13. The polymer alloy according to claim 9, wherein the proportions of the ethylene-tetrafluoroethylene copolymer and the polyphenylene sulfide are from 5/95 to 95/5 (by weight ratio).

14. The polymer alloy according to claim 1, wherein the melting point of the ethylene-tetrafluoroethylene copolymer is at most 235° C., and the melt flow rate is at least 30 g/10 min. at 297° C.

15. The polymer alloy according to claim 14, wherein the compatibilizer is an organo hydrolyzable silane having an amino group or an epoxy group.

16. The polymer alloy according to claim 15, wherein the proportions of the ethylene-tetrafluoroethylene copolymer and the polyphenylene sulfide are from 5/95 to 95/5 (by weight ratio).

17. The polymer alloy according to claim 1, wherein the proportion of the compatibilizer is from 0.3 to 5 wt % relative to the sum of the ethylene-tetrafluoroethylene copolymer and the polyphenylene sulfide.

18. The polymer alloy according to claim 14, wherein the proportion of the compatibilizer is from 0.3 to 5 wt % relative to the sum of the ethylene-tetrafluoroethylene copolymer and the polyphenylene sulfide.

* * * * *